3,667,859
HYDRAULIC SYSTEMS

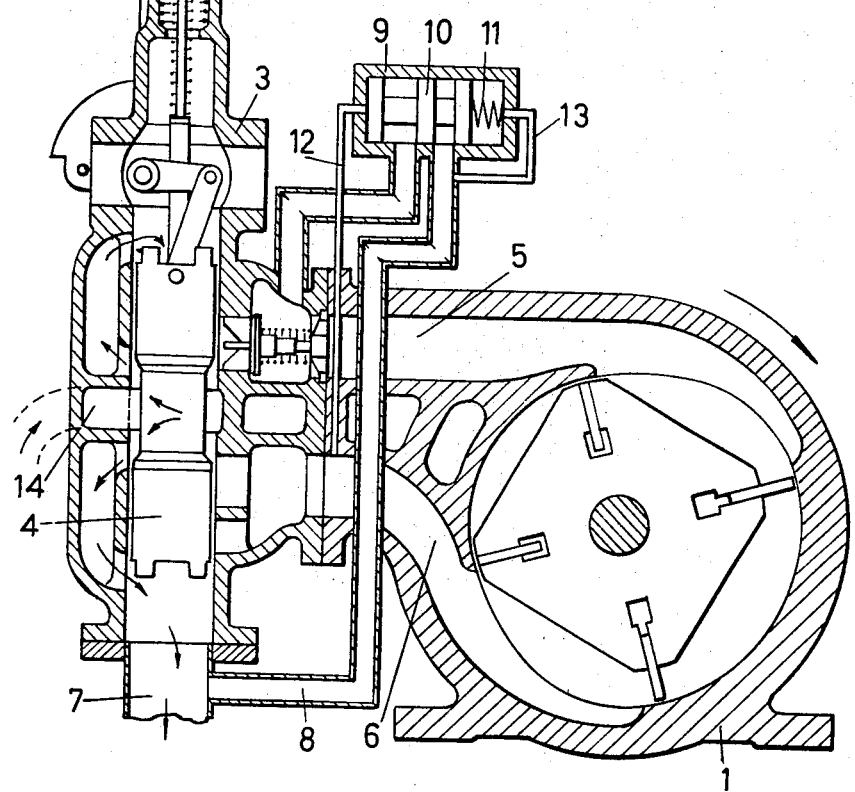
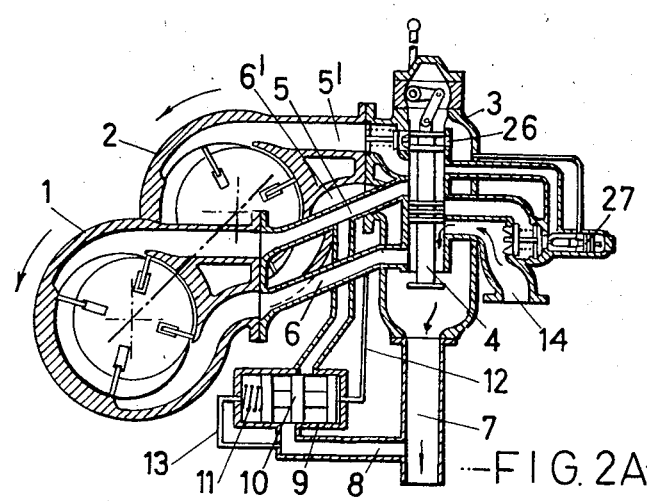

Inge Kore Dragsund and Erling M. Naas, Brattvag, Norway, assignors to A/S Hydraulik Brattvaag, Brattvag, Norway
Filed July 24, 1970, Ser. No. 58,083
Claims priority, application Norway, July 25, 1969, 3,076/69
Int. Cl. F04d 27/00; F04b 49/00
U.S. Cl. 415—148                                                  8 Claims

ABSTRACT OF THE DISCLOSURE

Hydraulic systems of the low pressure type which comprise a pump driving a motor, the working medium supply and discharge of which is controlled by a hand-operated control valve, said systems being provided with an automatically controlled by-pass passage from motor to pump. The passage opening in said by-pass passage is controlled by pressure of oil in an area between the slide of the control valve and the motor.

---

Figure 1B:
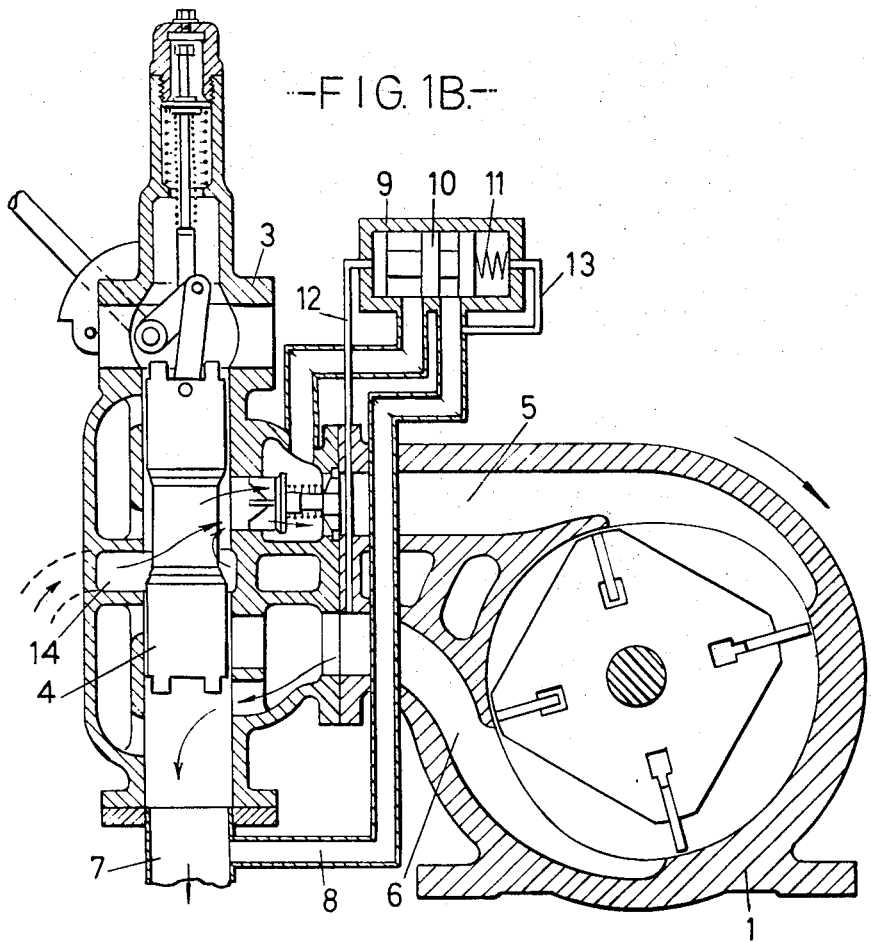

The invention relates to hydraulic systems of the low pressure type which comprise a motor, the working medium supply and discharge of which is controlled by a hand-operated control valve which in addition to being able to lead pressure medium to the motor so that the latter is driven in a working direction so as to act on an external force or in an opposite direction, is adapted so that in a positional location it causes a controlled quantity of working medium to escape from the motor while the latter is actuated by an external force in the same direction as the first and is thus moved towards the working direction and acts as a pump, and a source of pressure medium having a limited capacity for the system.

In such systems the force or load which acts on the hydraulic motor when the control valve closes the return to the pump, will build up a pressure in the corresponding circuit between the control valve and the motor. When this force is to move the motor towards its usual working direction, which can be called the return, for example when the load on a hydraulic winch is to be slackened, it is usual to allow the working medium to escape back to the return conduit of the system by means of the control valve. The source of pressure medium will in this case not produce any work in the motor, as it only provides circulation in the conduit system.

The pressure which is built up between the control valve and the motor when the control valve is closed, is dependent upon the external force. When the motor is to be moved by this force, the outlet opening which is uncovered by the slide of the control valve ought not to be larger than that the movement can occur at a precisely limited speed. In order to maintain this speed the same for different force influences different outlet openings are required.

In many instances, this can place a demand which cannot be satisfied by the valve operator. In all cases there will be the possibility for reckless handling of the system, since inexperienced personnel can readily open the return completely so that the external force is allowed to move the motor freely. With such a rapid movement of the motor, the capacity of the pump is exceeded and extra working medium must be sucked from the hydraulic system. The amount of working medium which is needed beyond the capacity of the pump is best obtained by inserting a back pressure valve between the pressure and return conduit immediately in front of the control valve. According to need, this will then open and working medium will be transferred to the reduced pressure region. In spite of this, there will, nevertheless, often be fomed a reduced pressure or so-called "vacuum knock" in the motor and the control valve. Such vacuum knocks place a big strain on the motor and, moreover, give an embarrassing noise and ought therefore to be avoided.

When the external force is permitted to produce such an uncontrolled movement of the motor, this movement must also be stopped again. This can occur abruptly by moving the control valve directly from the open to the closed position. In this way, there is produced in the motor a pressure rise which can result in a maximum pressure of up to 3 to 4 times the normal working pressure. Such a pressure rise will obviously place a strain on the hydraulic motor, which ought to be avoided.

It is an object of the invention to produce a hydraulic system of the afore-mentioned type in which the return of the motor during loading is approximately proportional to the turn of the control handle independent of the size of the load and to a predetermined maximum speed so that said return conveyance can occur without the risk of the formation of damaging depressed or excess pressures. Thus production is sought of a system in which the control of the return of the hydraulic motor can occur even on maximum loading without the risk of overloading the working circuit and which can therefore also be operated with certainty by inexperienced personnel.

According to the invention, this can be achieved in that the system is adapted so that the passage opening in a by-pass is controlled by the pressure of the quantity of oil which is supplied by the slide of the control valve to the discharge side of the motor, reckoned for operation in the working direction, when the motor is moved towards the working direction by the external force.

The invention can be utilized in motors of various types, but is especially suitable for rotating motors, for example of the simplex type or duplex type.

The by-pass can be arranged, with advantage, between the pressure side of the motor, reckoned for operation in the working direction, and the return conduit to the source of pressure medium.

The outlet of the by-pass can be placed between the motor and the control valve or the by-pass can be coupled in series to the control valve.

In addition, the system can comprise a further by-pass which is controlled by the slide of the control valve and which is so limited that not for any positional location of the slide can it alone by-pass the whole of the quantity of working medium from the pressure side of the motor, reckoned for operation in the working direction, when the motor is moved by the external force towards the working direction.

The by-pass can arbitrarily run into the return to the source of pressure medium, either directly into the return conduit or into a corresponding portion of the control valve.

For the control of the passage opening of the by-pass a pressure-controlled valve is appropriately employed which communicates with the discharge conduit of the motor via a control passage.

The by-pass can be arranged separately from the control valve or it can be wholly or partially built into the latter.

Figure 1C:
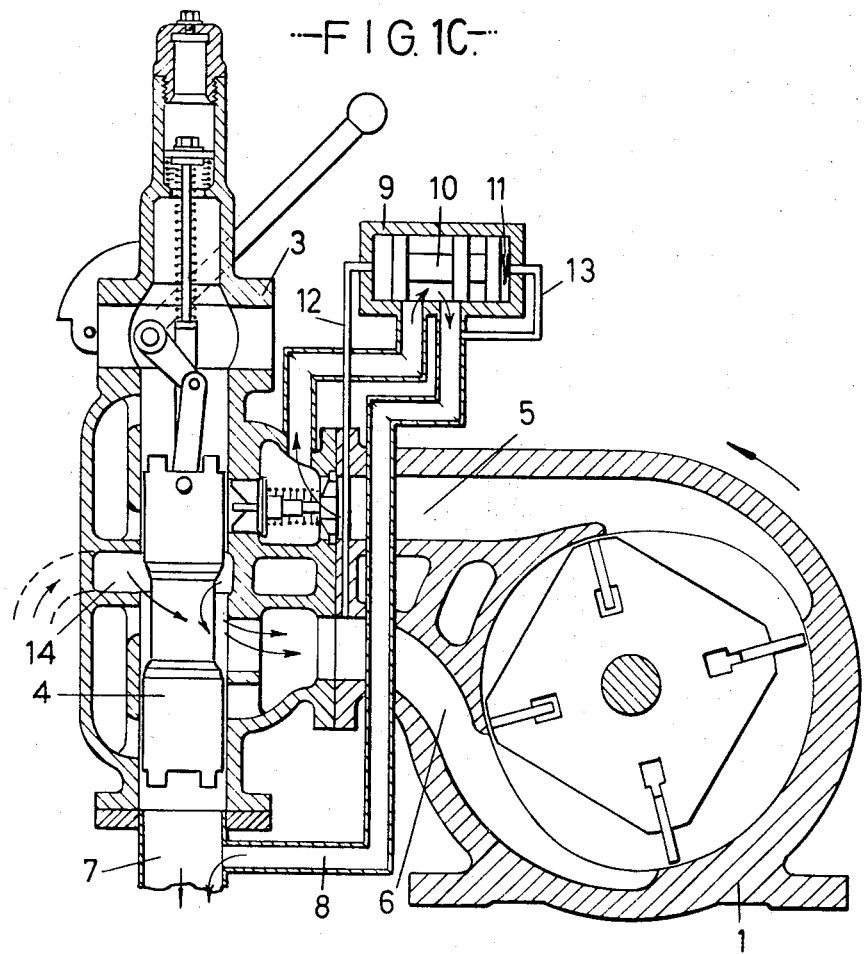
Figure 2C:
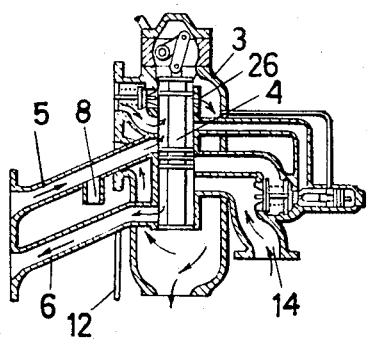
Figure 1D:
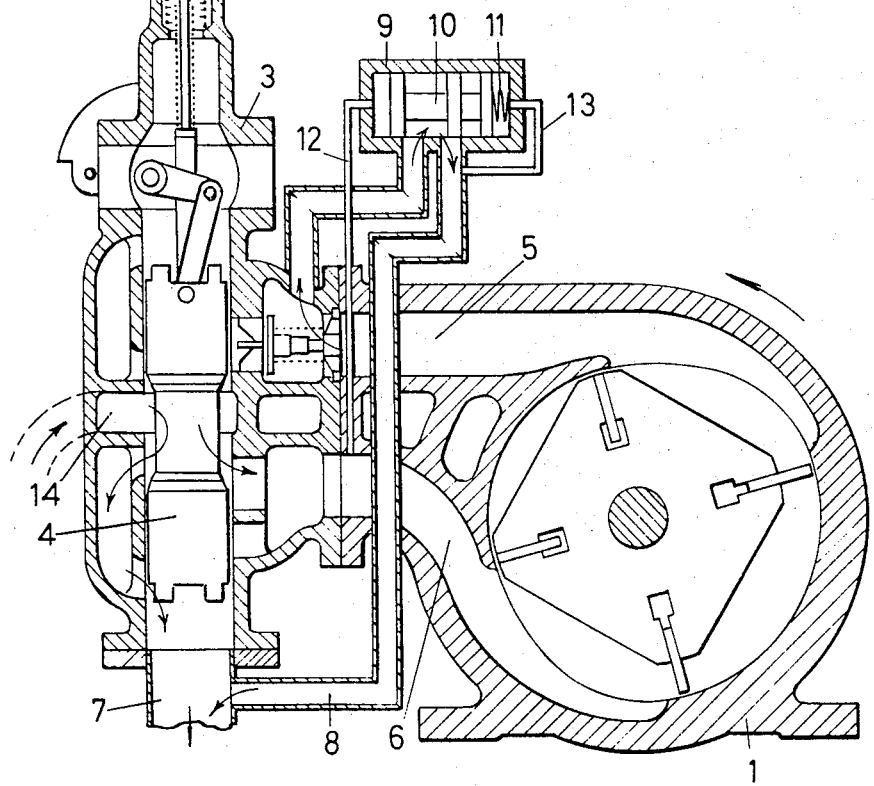

In order that the invention can be more clearly understood, convenient embodiments thereof will now be described, by way of example, with reference to the accompanying drawings, in which:

FIG. 1A is a section through a system according to the invention for winch operation, with a hydraulic motor of the simplex type and with the control valve in the stop position, FIG. 1B is the same section with the control valve in the lifting position, FIG. 1D is the same section with the control valve in the lifting position, FIG. 1C is the same section with the control valve in the position for slackening at reduced speed, FIGS. 2A-D are corresponding views for an alternative embodiment with a hydraulic motor of the duplex type, FIGS. 3A-D are corresponding views for a third embodiment with a hydraulic motor of the triplex type.

In the figures the actual directions of flow for the working medium, which in the examples are designated for the sake of simplicity by "oil," are indicated by arrows.

The examples show hydraulic motors which are especially suited for winch operation. The motors will have for this application a working direction or lifting direction (indicuated by an arrow) in which for raising of the load pressure oil is supplied to the motor or the motors and a reverse direction or slackening direction for slackening the wire, in which oil is either fed in the opposite direction to the first or the load draws the motor around so that the latter operates temporarily as a pump.

FIGS. 1A-D show a hydraulic motor of the simplex type. A motor 1 is coupled to a control valve 3 having a hand-operated control slide 4 via feed conduit 5 and a discharge conduit 6, the concepts "feed" and "discharge" being associated with the lifting direction. On slackening, these conduits will thus exchange functions.

Between the feed conduit 5 and a return conduit 7 to the source of oil of the motor 1, there is inserted a by-pass pipe 8 which goes through a pressure-controlled valve 9.

The valve 9 has a control piston 10 which at the same time is a valve body or slide and the latter is received in a passage and is moved towards a closing position by a pressure spring 11 arranged at the one end of the passage. The other end of the passage is connected to a control conduit 12 by the discharge conduit 6 of the motor 1.

The end of the valve passage which receives the pressure spring 11 communicates with the return conduit 7 through a connecting conduit 13.

The system comprises, in addition, a feed conduit 14 for oil from a source of oil not shown.

The mode of operation of the system in the various operating conditions is as follows:

In the stop position of the conrtol valve, as is illustrated in FIG. 1A, the slide 4 closes the feed conduit 5 of the motor 1, while the oil from the source of oil runs freely from the feed conduit 14, through the control valve 3 and back through the return conduit 7. The discharge conduit 6 of the motor is, therefore, free of pressure and the slide 10 in the valve 9 is in the shut-off position illustrated.

In the lifting position of the control valve, which is illustrated in FIG. 1B, the discharge conduit of the motor is also free of pressure and the valve 9 therefore remains closed and inoperative.

When there is to be slackening, the starting position of the slide 4 is the stop position. The discharge conduit 6 will then be free of pressure and the valve 9 closed. When the slide 4 is moved towards the position which is illustrated in FIG. 1D, the lowermost edge of the slide 4, as illustrated in the figure, narrows down the opening between the discharge conduit 6 and the return conduit 7. There is then built up a pressure in the discharge conduit 6, the pressure in the conduit 12 increasing simultaneously and when this reaches a predetermined level, the valve 9 opens and produces a discharge from the feed conduit 5 of the motor through the by-pass pipe 8. If the load attempts to draw the motor more rapidly around in the slackening direction than the rate the quantity of oil throttled in by the slide 4 at the discharge conduit 6 of the motor requires, the pressure in the latter falls and the valve 9 as a result closes completely or partially until the the pressure in the discharge conduit 6 builds up again.

In full slack, as illustrated in FIG. 1C, the slide 4 controls the whole of the oil delivery from the feed conduit 14 to the discharge conduit 6 of the motor. Here there is then builtu p a pressure such that the valve 9 opens nad releases oil. The motor will now rotate in the slackening direction at a maximum speed. If the load attempts to draw the motor at a greater speed than the oil supply to the discharge conduit 6 requires, the pressure falls here and the valve 9 closes; if the speed of the motor declines, the pressure increases and the valve 9 opens.

In previously known systems it is the slide 4 or a corresponding device which controls the discharge from the feed conduit 5 on slackening. The passage here must then be dimensioned so that the motor can be driven in the slackening direction without load, without there being built up a far too large pressure in the feed conduit 5 which will reduce the turning moment of the motor in this direction. With a load, there will be a large pressure in the feed conduit 5 of the motor and the flow of oil through the discharge will be large, and also the slackening speed of the load, and on rapid braking of the latter there can be obtained a maximum pressure of up to 3-4 times the normal working pressure. At the same time there will be problems in getting sufficient oil to the discharge conduit 6 of the motor. On rapid braking the oil stream is "worn off" and a vacuum knock results. A particular position of the slide 4 will give a particular discharge opening from the feed conduit 5, and hence there will be a large variation in the rate of slackening with different loads and at different oil temperatures.

The novelty in the system according to the invention is that on slackening the quantity of oil which is guided into the discharge conduit 6 of the motor by the slide 4 is allowed to build up a pressure which controls a valve 9 which in turn regulates the discharge from the feed conduit 5. Hence the rate of slackening at any time corresponds to the quantity of oil which is supplied through the discharge conduit 6 to the working chambers of the motor. This quantity of oil is approximately proportional (the pressure is equal to the opening pressure of the valve 9) to the turn of the slide 4 and hence of the control handle when it is slackened with a load. Since the maximum speed is decided by the quantity of oil which is supplied to the system and by the size of the motor, that is to say the quantity of oil which is used per revolution, and due to the fact that the closing and opening characteristics of the valve 9 can be regulated by for example a throttling device in the control conduit 12 and in the connecting conduit 13, the pressure increases which anew on braking the load can be regulated and maintained within a desired value. On slackening without a load or if the motor is loaded in the slackening direction the pressure in the discharge conduit 6 will be larger than the opening pressure of the valve 9 and this will open completely and a complete turning moment can be taken out in this direction.

The valve 9 and the by-pass pipe 8 can be designed as a unit with the housing of the control valve 3, they can be mounted on the latter or they can be arranged separately from the control valve.

The advantages which are pointed out for the embodiment indicated are present in other embodiments and applications of the same system.

In a further embodiment which is illustrated in FIG. 2A-D the motor is thus of the duplex type. The motor is composed of two separate motors 1 and 2 on a common shaft. This hydraulic motor can also be considered for use in the operation of a winch drum. In addition to the parts which are found in the system of FIG. 1A-D, this system has a transfer valve 27 which is coupled to the motor 2 when the oil pressure in the motor 1 exceeds a particular level when the motor goes in the lifting direction. In the control valve 3 there is a narrow split opening 26 which on slackening releases a limited quantity of oil from the feed conduits 5 and 5' of the motors 1 and 2 over to the return conduit 7. Other corresponding parts are designated by the same reference numerals as in FIG. 1A–D.

The discharge conduit 6' of the motor 2 is directly coupled to the return conduit 7 via the control valve 3, so that when there is slackening oil is supplied from the feed conduit 14 only to the discharge conduit 6 of the motor 1.

Figure 2B:
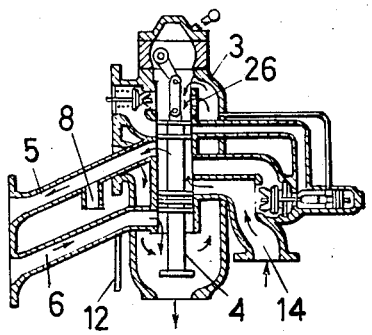

With the control valve 3 in the stop position FIG. 2A and the lifting position FIG. 2B, the mode of operation is as described for FIG. 1A–D.

Figure 2D:
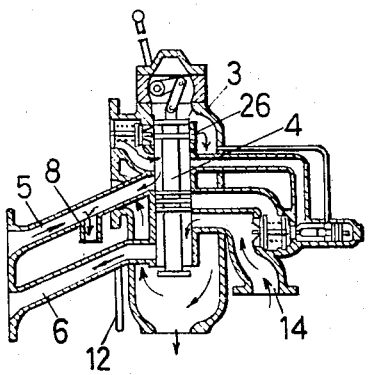

On slackening the slide is moved towards the position which is illustrated in FIG. 2D. The lowermost edge of the slide 4 narrows down the opening between the feed conduit 14 and the return conduit 7 through the control valve 3. There is then built up a pressure in the discharge conduit 6 which is employed for controlling the valve 9 in the by-pass pipe 8 as is described for FIGS. 1D and 1C. In addition, the slit opening 26 releases oil from the feed conduits 6 of the motors 1 and 2 to the return conduit 7. This slit opening is so small that in no position of the slide 4 can it release over the whole of the quantity of oil which is to be diverted from the feed conduits 5 and 5' of the motors 1 and 2. Thus the valve 9 opens and it is this which controls the speed of the motor on slackening. The slit 26 serves only to dampen possible oscillations which can occur in the valve 9. The mode of operation and advantages, moreover, are evident from the description for FIG. 1A–D.

In a third embodiment which is illustrated in FIG. 3A–D the motor is a hydraulic motor 15 of the triplex type having three separate working chambers 16, 17 and 18 with separate feed and discharge ducts. Of these the feed duct and the discharge duct, reckoned for operation in the working direction, are designated in the figures for motor chamber 18 by reference numerals 5 and 6 respectively. Other corresponding parts are designated by the same reference numerals as in FIG. 1A–D and FIG. 2A–D. This hydraulic motor can also be considered for use in the operation of a winch drum.

This system has a transfer valve 19 which is coupled to motor chamber 17 when the oil pressure in the motor chamber 16 exceeds a particular level and a change-over valve 20 which is coupled to motor chamber 18 when the pressure in the two first motor chambers exceeds another, higher level. The discharge ducts from the motor chambers 16 and 17 are directly coupled here to the return conduit 7 via the control valve 3 (at 6'') so that when there is slackening the oil is supplied from the feed conduit 14 only to the discharge conduit 6 of the working chamber 18.

A further description of the control of this type of motor is to be found for example in Norwegian patent specification No. 86,819.

The system here comprises a by-pass pipe 21 which is inserted between an outlet 22 from the slide 4 and the lower portion of the control valve 3, from which there is a free connection to the return conduit 7. The by-pass valve 9 is generally of the same type as that which is illustrated in FIG. 1A. In this type of construction, however, the two ends of the slide 10 communicate with each other through a nozzle 23 which in the embodiment illustrated is arranged in the slide 10 itself. In the conduit 13 there is inserted an adjustable control valve 25 which operates as a back-pressure valve having a spring-loaded body 25. The object of the control valve 24 will be evident from the following portions of the specification.

Figure 3A:
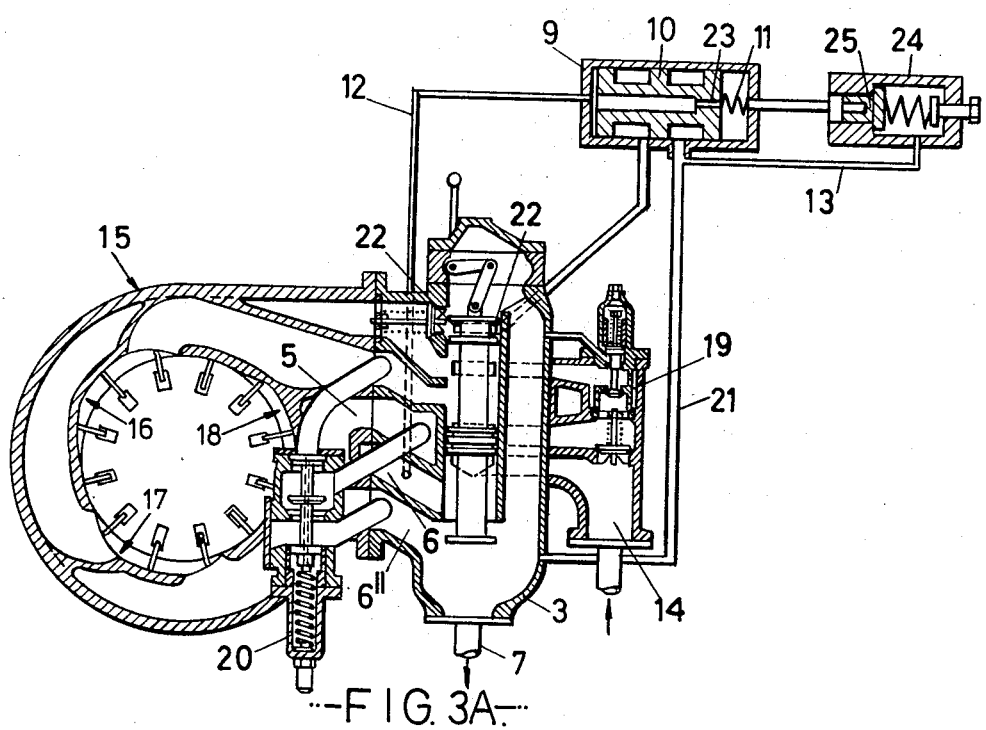
Figure 3B:
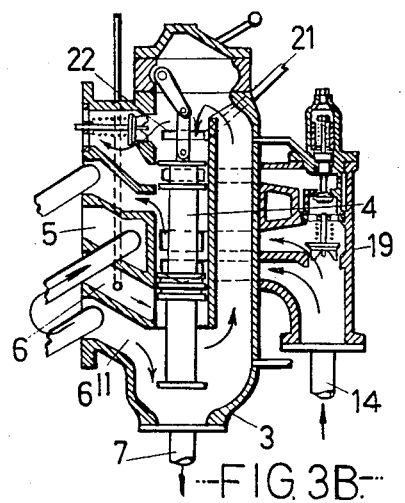
Figure 3C:
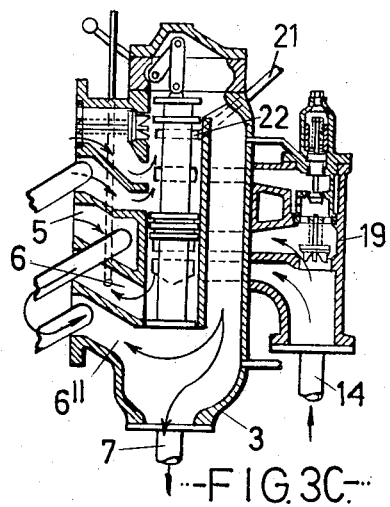

The mode of operation of this embodiment is as follows:

In the stop position of the control valve, as is illustrated in FIG. 3A, and in the lifting position, as is illustrated in FIG. 3B, the by-pass valve 9 is closed since the discharge duct 6 is free of pressure. In the stop position the slide 4 will also close outlet 22 to the by-pass pipe 21.

On slackening the oil from the discharge ducts 6'' of the motor chambers 16 and 17 must flow through the outlet 22 and the by-pass pipe 21 having the valve 9. If the pressure is so large that the change-over valve 20 is coupled in, oil will also flow from the motor chamber 18. This is, however, not illustrated in FIG. 3C, where the oil goes from the pressure side of the motor chamber 17 in by-pass through the change-over valve 20.

Figure 3D:
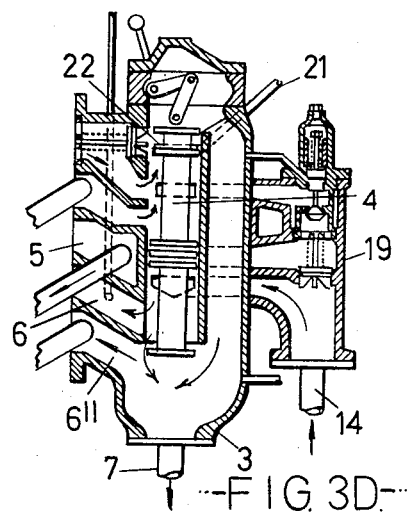

When the control handle is moved towards the slackening position as illustrated in FIG. 3D the slide 4 opens for outlet 22 and simultaneously there is built up pressure in the discharge duct 6 as is described for FIG. 1 and 2. This pressure is transmitted through the control conduit 12 and through the nozzle 23 in the slide 10 to the valve body 25 in the valve 24. So long as the valve is maintained closed the pressure will be the same at both ends of the slide 10 and the spring 11 will hold the valve 9 closed. When the pressure reaches a particular level, dependent upon the adjustment of the spring, the valve 24 opens. An appropriate opening pressure can, for example, be 4 kp./cm.$^2$. The nozzle 23 limits the flow of oil through the slide 10 so that by a small increase of the pressure in the conduit 12 the slide 10 is displaced and opens for discharge from the feed ducts 5. If the pressure in the discharge duct 6 falls again because the motor receives too large a speed or the control handle is moved towards stop, the valve 24 closes and the spring 11 closes the valve 9 again. The valve 24 is inserted so that in indivdual cases its gives a better dampening than the previously described types. That the by-pass pipe 21 is taken out from the slide 4 gives a more reliable system since the load can be stopped in a traditional manner if the valve 9 should fail, as for example with a break in the spring.

The mode of operation and advantages, moreover, will be evident from the descriptions for FIG. 1A–D and FIG. 2A–D.

The embodiments which are illustrated here are not connected to the individual types of motor. They can be combined and can also be used for motors having several working chambers and by other types than those which are shown here. Thus the outlet 22, FIG. 2, can for example be used in the embodiment as illustrated in FIG. 3, and the embodiment in FIG. 3 can be employed for the other types of motor. Which embodiment is the most favourable in any individual instance depends upon what conditions the motors are to work under. There can also be other embodiments, but common to all is that when the motor is driven towards the working direction, the oil supply from the control valve to one or several working chambers controls the discharge from the working chamber of the motor.

The motor must operate with a speed which corresponds to this quantity of oil. If the speed of the motor falls there is built up a pressure and the valve opens for the discharge from the working chamber or working chambers; if the speed of the motor increases, the pressure falls and the valve closes as is described.

What we claim is:

1. A hydraulic system, comprising a hydraulic motor adapted to impart an operative force on an external member in response to a pressurized fluid medium being supplied thereto, said motor having fluid medium inlet and outlet passageways; a control slide valve connected to said passageways for respectively conveying and receiving said fluid medium to and from said motor, and by-pass valve means connected to said control slide valve and to said motor so as to be responsive to the fluid medium pressure in the outlet passageway thereof, said by-pass valve including a first fluid medium by-pass passageway responsive to a predetermined operational position of said control slide valve to effect releasing flow of a controlled quantity of the fluid medium through the outlet passageway of said motor in the operative direction thereof, said motor further being acted upon by said external member for actuation in the operative direction thereof so as to essentially constitute a pump, and a second by-pass passageway responsive to the pressure of a supply of the fluid medium conveyed by said control slide valve to the outlet passageway of said motor, said outlet passageway being adapted to provide a reverse flow inlet passage upon operation of said motor slackening, and facilitating operation of said by-pass valve means to control said control slide valve.

2. A hydraulic system as claimed in claim 1, said by-pass valve means being positioned intermediate the outlet passageway of said motor and a return conduit for said fluid medium leading to the supply source therefor.

3. A hydraulic system as claimed in claim 1, wherein said by-pass valve means includes an outlet conduit communicating between said motor and said control slide valve.

4. A hydraulic system as claimed in claim 1, comprising conduit means connecting said by-pass valve means in fluid medium series-flow relationship with said control slide valve.

5. A hydraulic system as claimed in claim 1, comprising a further by-pass passageway, said last-mentioned passageway being adapted to, during the operative condition of said motor acted upon by said external member, to limit by-passing of the fluid medium being returned through said outlet passageway to a portion of the whole quantity thereof, over the full operative range of said control slide valve.

6. A hydraulic system as claimed in claim 1, said by-pass valve means comprising a slide valve having a conduit communicating with the passageway of said motor receiving a flow of said fluid medium during intervals when said control slide valve is in an inoperative position.

7. A hydraulic system as claimed in claim 6, wherein said by-pass valve means includes an axially reciprocable slide, said slide being positioned in a bore defining two variable volume chambers located on either side of said slide, one of said chambers communicating with said conduit, and the other of said chambers including a damping conduit connecting said chamber with a fluid medium return conduit; and spring means for normally urging said slide in a predetermined axial direction.

8. A hydraulic system as claimed in claim 7, wherein said chambers include conduit means for communicating with each other, said damping conduit including a fluid medium transfer valve having a pressure-responsive adjustable aperture.

References Cited

UNITED STATES PATENTS 3,253,607   5/1966   Drutchas _____ 417—310

FOREIGN PATENTS 1,083,696   6/1954   France _____ 417—310

HENRY F. RADUAZO, Primary Examiner

U.S. Cl. X.R.

415—152; 417—310